(12) United States Patent
Han et al.

(10) Patent No.: US 12,210,397 B2
(45) Date of Patent: *Jan. 28, 2025

(54) APPARATUS, METHOD, AND SYSTEM FOR POWER CONSUMPTION MANAGEMENT OF SYSTEM-ON-CHIP

(71) Applicant: SAMSUNG ELECTRONICS CO., LTD., Suwon-si (KR)

(72) Inventors: Dong-Hee Han, Hwaseong-si (KR); Dae-yeong Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,613

(22) Filed: Oct. 6, 2023

(65) Prior Publication Data

US 2024/0036628 A1 Feb. 1, 2024

Related U.S. Application Data

(63) Continuation of application No. 17/461,022, filed on Aug. 30, 2021, now Pat. No. 11,803,225, and a
(Continued)

(30) Foreign Application Priority Data

Oct. 30, 2017 (KR) .................. 10-2017-0142872

(51) Int. Cl.
*G06F 1/32* (2019.01)
*G06F 1/3206* (2019.01)
(Continued)

(52) U.S. Cl.
CPC ............ *G06F 1/324* (2013.01); *G06F 1/3206* (2013.01); *G06F 1/3243* (2013.01); *G06F 1/329* (2013.01); *G06F 15/7807* (2013.01)

(58) Field of Classification Search
None
See application file for complete search history.

(56) References Cited

U.S. PATENT DOCUMENTS 7,263,457 B2 * 8/2007 White .................. G06F 1/3296
702/132
7,761,274 B1 * 7/2010 Pippin ................. G06F 11/3058
702/132
(Continued)

FOREIGN PATENT DOCUMENTS

CN 104205087 A 12/2014
CN 104951044 A 9/2015
(Continued)

*Primary Examiner* — Jaweed A Abbaszadeh
*Assistant Examiner* — Cheri L Harrington
(74) *Attorney, Agent, or Firm* — Sughrue Mion, PLLC

(57) ABSTRACT

In a method of operating a system-on-chip (SOC), the SOC includes a plurality of processor cores. An operating frequency of the plurality of processor cores is set to a first operating frequency based on permitted power consumption of the SOC and an operating status of the plurality of processor cores. The first operating frequency is within a maximum operating frequency of the plurality of processor cores. At least one of the plurality of processor cores performs at least one processing operation based on the first operating frequency. When present power consumption of the SOC is determined as exceeding the permitted power consumption, a warning signal is activated, and a first control operation for reducing the present power consumption is performed immediately thereafter.

18 Claims, 14 Drawing Sheets

Related U.S. Application Data continuation of application No. 16/033,830, filed on Jul. 12, 2018, now Pat. No. 11,126,246.

(51) Int. Cl.
*G06F 1/3234* (2019.01)
*G06F 1/324* (2019.01)
*G06F 1/329* (2019.01)
*G06F 15/78* (2006.01)

(56) References Cited

U.S. PATENT DOCUMENTS

| | | | |
|---|---|---|---|
| 8,869,152 B1 * | 10/2014 | Abrishami | G06F 1/324 |
| | | | 713/300 |
| 9,137,848 B2 | 9/2015 | Nho | |
| 9,176,572 B2 | 11/2015 | Thomson et al. | |
| 9,235,256 B2 | 1/2016 | Herdrich et al. | |
| 9,377,830 B2 * | 6/2016 | Yang | G06F 1/3287 |
| 9,582,012 B2 | 2/2017 | Park et al. | |
| 9,588,915 B2 | 3/2017 | Yu | |
| 9,600,059 B2 | 3/2017 | Sotomayor | |
| 11,644,884 B2 * | 5/2023 | Felix | G06F 1/324 |
| | | | 713/322 |
| 2009/0235108 A1 | 9/2009 | Gold et al. | |
| 2012/0011377 A1 | 1/2012 | Yu et al. | |
| 2012/0144215 A1 * | 6/2012 | Naffziger | G06F 1/26 |
| | | | 713/340 |
| 2013/0132749 A1 * | 5/2013 | Halepete | G06F 1/324 |
| | | | 713/322 |
| 2013/0205126 A1 | 8/2013 | Kruglick | |
| 2013/0246820 A1 * | 9/2013 | Branover | G06F 1/206 |
| | | | 713/320 |
| 2014/0173311 A1 | 6/2014 | Park et al. | |
| 2014/0215253 A1 * | 7/2014 | Klassen | G06F 1/3296 |
| | | | 713/340 |
| 2015/0160714 A1 | 6/2015 | Jun et al. | |
| 2015/0194969 A1 * | 7/2015 | Kawabe | G06F 1/3243 |
| | | | 327/114 |
| 2015/0277534 A1 | 10/2015 | Park et al. | |
| 2015/0286261 A1 | 10/2015 | Bose et al. | |
| 2015/0286262 A1 * | 10/2015 | Park | G05D 23/1917 |
| | | | 713/320 |
| 2016/0034013 A1 | 2/2016 | Kim et al. | |
| 2016/0054780 A1 | 2/2016 | Bodas et al. | |
| 2016/0147277 A1 | 5/2016 | Park et al. | |
| 2016/0239074 A1 | 8/2016 | Lee et al. | |
| 2016/0321102 A1 | 11/2016 | Lee et al. | |
| 2017/0031418 A1 | 2/2017 | Allen-Ware et al. | |
| 2017/0068296 A1 * | 3/2017 | Mair | G06F 1/28 |
| 2018/0167878 A1 | 6/2018 | Lee et al. | |
| 2018/0260152 A1 | 9/2018 | Bar et al. | |
| 2018/0284879 A1 * | 10/2018 | Gorbatov | G06F 15/76 |

FOREIGN PATENT DOCUMENTS

| | | |
|---|---|---|
| CN | 107077180 A | 8/2017 |
| JP | 2016-181168 A | 10/2016 |
| KR | 10-2016-0042618 A | 4/2016 |

\* cited by examiner

APPARATUS, METHOD, AND SYSTEM FOR POWER CONSUMPTION MANAGEMENT OF SYSTEM-ON-CHIP

CROSS-REFERENCE TO THE RELATED APPLICATION

This is a continuation of U.S. application Ser. No. 17/461,022 filed Aug. 30, 2021, which is a continuation of U.S. application Ser. No. 16/033,830, filed on Jul. 12, 2018 in the United States Patent and Trademark Office, which claims priority from Korean Patent Application No. 10-2017-0142872, filed on Oct. 30, 2017 in the Korean Intellectual Property Office, the disclosures of which are incorporated herein by reference in their entireties.

BACKGROUND

1. Field

Example embodiments relate generally to power management, and more particularly to methods of operating system-on-chips, system-on-chips performing the methods and electronic systems including the system-on-chips.

2. Description of the Related Art

A system-on-chip (SOC) refers to a processing system that integrates various functional blocks (e.g., a central processing unit (CPU), a memory, an interface unit, a digital signal processing unit, an analog signal processing unit, etc.) in a single, or a few, semiconductor integrated circuits (ICs) to implement an electronic system, such as a computer system, using a limited number of ICs. Recently, a system-on-chip including a plurality of processor cores has been developed as performance of an electronic system is enhanced or improved, and researchers are conducting various research projects on techniques of optimizing power management and performance of the plurality of processor cores included in the system-on-chip.

SUMMARY

At least one example embodiment of the inventive concept provides a method of operating a system-on-chip (SOC) capable of optimizing performance of the SOC based on permitted power consumption.

At least one example embodiment of the inventive concept provides an SOC that performs the method of operating the SOC.

At least one example embodiment of the inventive concept provides an electronic system that includes the SOC.

According to example embodiments, there is provided a method of operating an SOC which includes a plurality of processor cores. The method may include: setting an operating frequency of the plurality of processor cores to a first operating frequency based on permitted power consumption of the SOC and an operating status of the plurality of processor cores, the first operating frequency being within a maximum operating frequency of the plurality of processor cores; performing, by at least one of the plurality of processor cores, at least one processing operation based on the first operating frequency; in response to determining that present power consumption of the SOC exceeds the permitted power consumption, activating a warning signal; and performing a first control operation for reducing the present power consumption immediately after the warning signal is activated.

According to example embodiments, there is provided an SOC which may include: a dynamic voltage and frequency scaling (DVFS) controller configured to set an operating frequency of a plurality of processor cores to a first operating frequency based on permitted power consumption of the SOC and an operating status of the plurality of processor cores, the first operating frequency being within a maximum operating frequency of the plurality of processor cores; a processing unit including the plurality of processor cores, and configured to perform at least one processing operation based on the first operating frequency; and a control logic configured to receive a warning signal that is activated in response to determining that present power consumption of the SOC exceeds the permitted power consumption, and perform a first control operation for reducing the present power consumption immediately after the warning signal is activated.

According to example embodiments, there is provided an SOC which may include: a processing unit comprising a plurality of processor cores, and configured to perform at least one processing operation based on a first operating voltage or frequency; a dynamic voltage and frequency scaling (DVFS) controller configured to change a maximum operating voltage or frequency, which is respectively greater than or equal to the first operating voltage or frequency, depending on at least one of a number of processor cores which are active, a workload of the at least one processing operation, and a type of the at least one processing operation; and a control logic configured to receive a warning signal that is activated in response to determining that present power consumption of the SOC exceeds permitted power consumption, and decrease a current operating voltage or frequency after the warning signal is activated.

In the method of operating the SOC and the SOC that performs the method according to example embodiments, the operating frequency of the plurality of processor cores may be determined among different setting frequencies, without restriction, within a range of satisfying the permitted power consumption. In addition, when the present power consumption of the SOC almost reaches the permitted power consumption, the operating frequency may be decreased based on the warning signal, and thus the power consumption of the SOC may not exceed the limited power consumption. Accordingly, the SOC may operate based on the highest operating frequency within the permitted power consumption, and performance of the SOC and the electronic system including the SOC may be maximized and optimized.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EXAMPLE EMBODIMENTS

Figure 1:
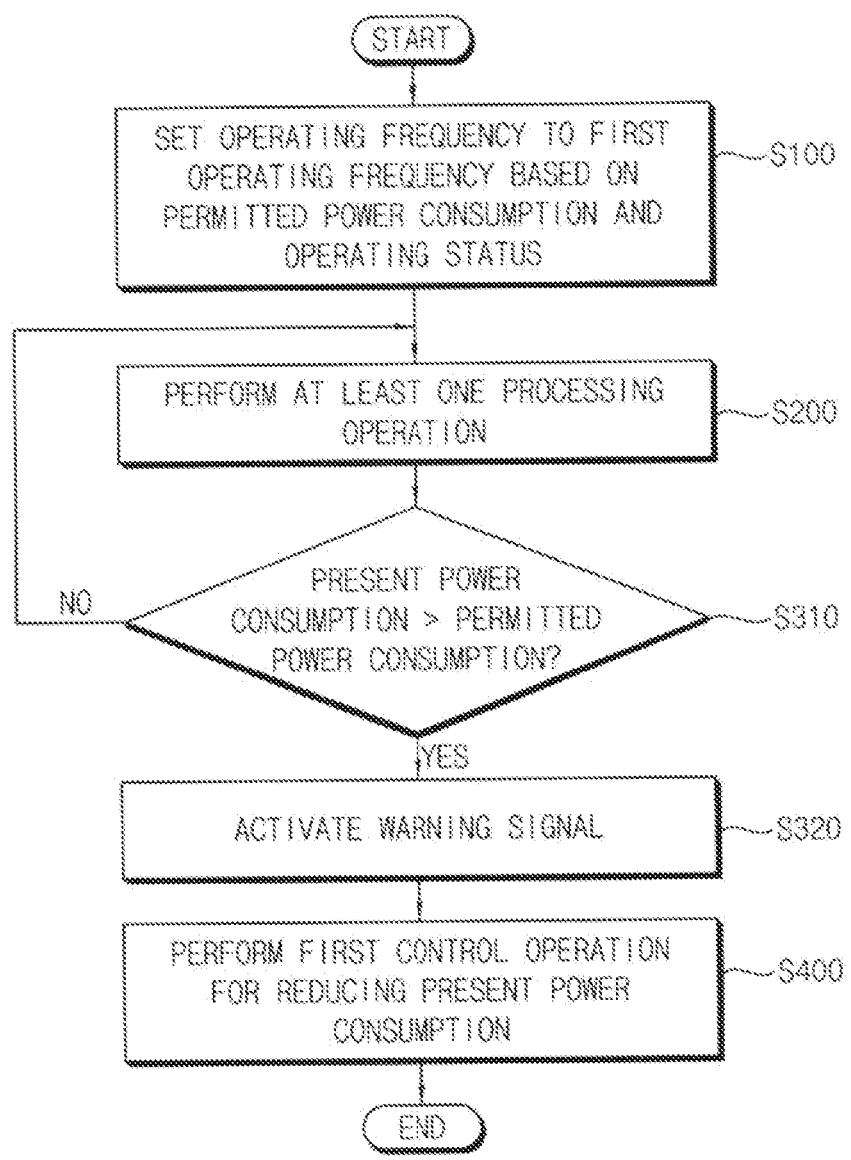
FIG. 1 is a flow chart illustrating a method of operating a system-on-chip (SOC) according to example embodiments.

Various example embodiments will be described more fully with reference to the accompanying drawings. The inventive concept may, however, be embodied in many different forms and should not be construed as limited to the embodiments set forth herein. Like reference numerals refer to like elements throughout the descriptions of the embodiments.

FIG. 1 is a flow chart illustrating a method of operating a system-on-chip (SOC) according to example embodiments.

Referring to FIG. 1, in a method of operating an SOC according to example embodiments, the SOC includes a plurality of processor cores. An operating frequency of the plurality of processor cores is set to a first operating frequency based on permitted power consumption of the SOC and an operating status of the plurality of processor cores (S100). The first operating frequency is within a maximum operating frequency of the plurality of processor cores.

The permitted power consumption of the SOC may represent an acceptable and/or maximum amount of power consumed by the SOC within its normal range and limit in which the SOC normally works or operates. The permitted power consumption may be predetermined in a phase of designing and/or manufacturing of the SOC. The operating status of the plurality of processor cores may include the number of processor cores that actually works or operates, a workload of a processing operation performed by the processor cores that actually work or operate, etc. The permitted power consumption of the SOC and the operating status of the plurality of processor cores will be described in detail with reference to FIGS. 3A, 3B, 4A and 4B. The first operating frequency may be less than or equal to the maximum operating frequency. The first operating frequency may represent an operating frequency for optimized performance that is set in accordance with the permitted power consumption and the present operating status of the plurality of processor cores within their normal ranges and limits in which the plurality of processor cores normally work or operate.

At least one of the plurality of processor cores performs at least one processing operation based on the first operating frequency (S200). While the at least one processing operation is performed, it is determined whether present power consumption of the SOC exceeds the permitted power consumption (S310).

When it is determined that the present power consumption does not exceed the permitted power consumption (S310: NO), e.g., when the present power consumption is less than or equal to the permitted power consumption, the at least one of the plurality of processor cores continuously performs the at least one processing operation based on the first operating frequency (S200).

When it is determined that the present power consumption exceeds the permitted power consumption (S310: YES), a warning signal is activated (S320). For example, the warning signal may be provided or received from a power management integrated circuit (PMIC) that is disposed outside the SOC.

When the present power consumption exceeds the permitted power consumption, the SOC and/or a computing system or an electronic system including the SOC may not normally work or operate, and may abnormally work or operate. For example, when the present power consumption exceeds the permitted power consumption, the SOC may be damaged or broken due to an excessive current that is more than a reference current, or the SOC may have a high temperature that is higher than a reference temperature, thereby causing a malfunction of the SOC and/or the computing system or the electronic system including the SOC. Thus, the warning signal may be activated to notify an abnormal status (e.g., the excessive current, the high temperature, etc.) to the SOC.

A first control operation for reducing the present power consumption is performed immediately after or right after the warning signal is activated (S400). For example, the first control operation may represent an operation of reducing the present power consumption relatively urgently, quickly, rapidly, drastically and/or significantly. The first control operation will be described in detail with reference to FIG. 5.

Figure 2:
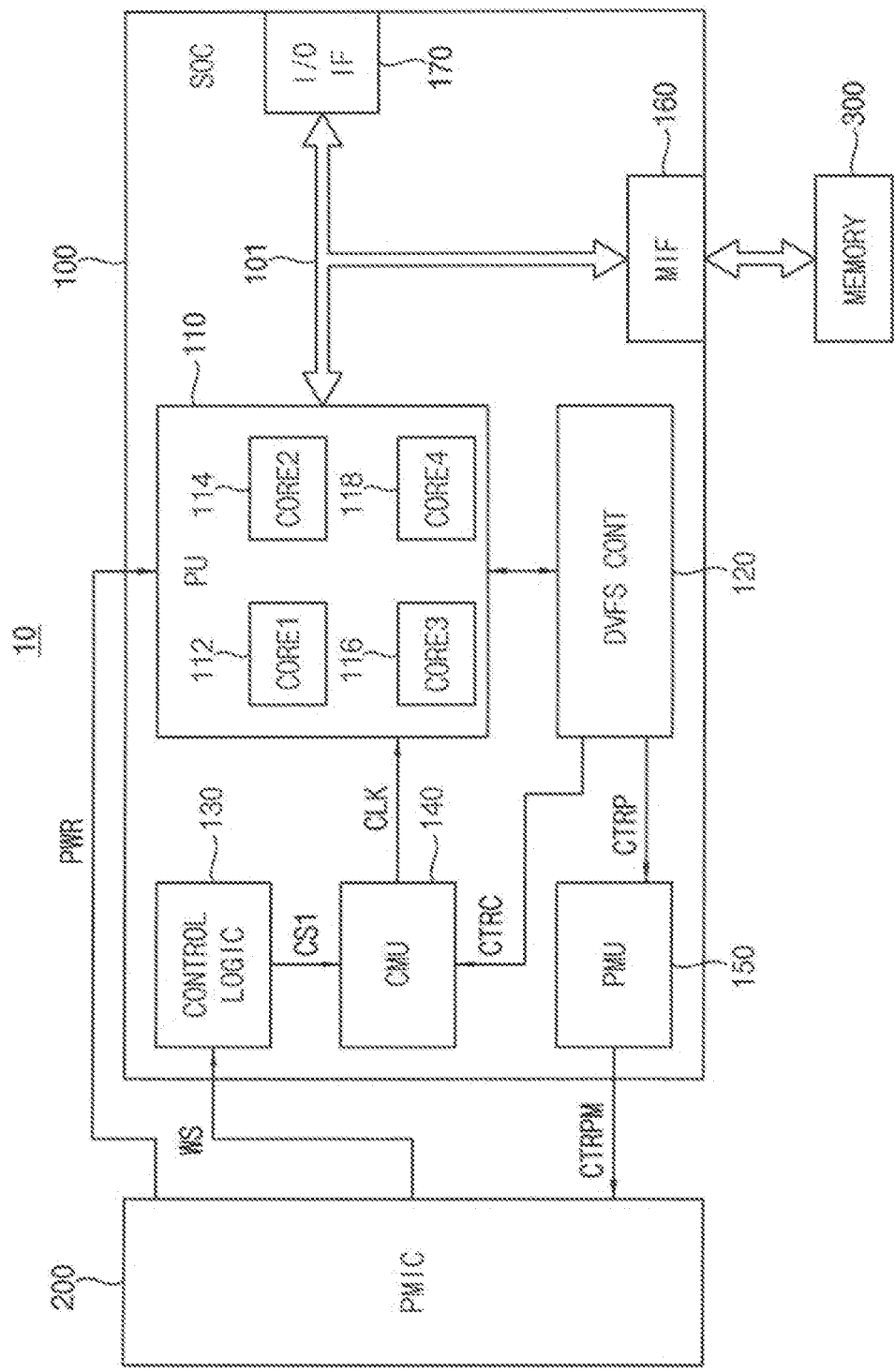
FIG. 2 is a block diagram illustrating an electronic system including a SOC according to example embodiments.

FIG. 2 is a block diagram illustrating an electronic system including an SOC according to example embodiments.

Referring to FIG. 2, an electronic system 10 includes an SOC 100, a PMIC 200 and a memory device 300.

In some example embodiments, the electronic system 10 may be any computing device or any mobile/portable device, such as a mobile phone, a smart phone, a tablet computer, a laptop computer, a personal digital assistants (PDA), an enterprise digital assistant (EDA), a portable multimedia player (PMP), a digital camera, a portable game console, a music player, a camcorder, a video player, a navigation device, a wearable device, an Internet of things (IoT) device, an Internet of everything (IoE) device, an e-book, a virtual reality (VR) device, an augmented reality (AR) device, a robotic device, etc.

The SOC 100 performs the method of FIG. 1 according to example embodiments. The SOC 100 includes a 110, a dynamic voltage and frequency scaling (DVFS) controller (DVFS CONT) 120 and a control logic 130. The SOC 100 may further include an internal bus 101, a clock management unit (CMU) 140, a power management unit (PMU) 150, a memory interface (MIF) 160 and an input/output (I/O) interface (I/O IF) 170.

In some example embodiments, the SOC 100 may be an application processor (AP), a mobile AP, or the like.

The processing unit 110 controls overall operations of the SOC 100, and performs various computational functions, such as particular calculations and tasks. For example, the processing unit 110 may control the DVFS controller 120, the memory interface 160 and the I/O interface 170, and may control various elements included in the SOC 100. The processing unit 110 may operate based on a first clock signal CLK and a first power supply signal PWR.

The processing unit 110 includes a plurality of processor cores (CORE1, CORE2, CORE3 and CORE4) 112, 114, 116 and 118. In other words, the processing unit 110 may be a multi-core processing unit. At least one of the plurality of processor cores 112, 114, 116 and 118 may be driven to perform at least one of various operations, works or jobs, such as particular calculations, tasks and controls.

In some example embodiments, the processing unit 110 may include a central processing unit (CPU) or a graphic processing unit (GPU). In other example embodiments, the processing unit 110 may include one or more processors, e.g., an image signal processor (ISP), a digital signal processor (DSP), a display processor, a communication processor (e.g., a modem chip), a multimedia processor, or the like.

The DVFS controller 120 may control the first clock signal CLK and the first power supply signal PWR. For example, A DVFS technology may be employed in the SOC 100, and the DVFS controller 120 may adjust a frequency of the first clock signal CLK and/or a voltage level of the first power supply signal PWR based on the DVFS technology. The DVFS technology represents a technology that dynamically controls or adjusts an operating frequency and an operating voltage of the SOC 100 to reduce power consumption.

Although not illustrated in FIG. 2, the processing unit 110 may include a performance monitor that measures or counts performance parameters. For example, the performance parameters may include instruction cycles, workloads, cache hits, cache misses, branch misses, etc. The processing unit 110 may generate an interrupt according to an operation of the performance monitor, and the DVFS controller 120 may generate a first clock control signal CTRC for controlling the first clock signal CLK and a first power control signal CTRP for controlling the first power supply signal PWR based on the interrupt that is provided from the processing unit 110.

The control logic 130 receives a warning signal WS from the PMIC 200. As described with reference to FIG. 1, the warning signal WS is activated when the present power consumption of the SOC 100 exceeds the permitted power consumption, and the control logic 130 may generate a first control signal CS1 immediately after the warning signal WS is activated such that the first control operation for urgently reducing the present power consumption is performed based on the first control signal CS1.

The CMU 140 may generate the first clock signal CLK for the processing unit 110 based on the first clock control signal CTRC. For example, the CMU 140 may increase, maintain or decrease the frequency of the first clock signal CLK based on the first clock control signal CTRC. Further, the CMU 140 may urgently and drastically change the frequency of the first clock signal CLK based on the first control signal CS1.

The PMU 150 may monitor the present power consumption of the SOC 100, may store information about the permitted power consumption of the SOC 100, and may compare the present power consumption with the permitted power consumption. The PMU 150 may generate a power management control signal CTRPM for controlling the PMIC 200 based on the first power control signal CTRP and/or a result of the comparing operation.

The memory interface 160 may control or facilitate data transfer between the SOC 100 and the memory device 300. For example, the memory interface 160 may control a write operation or a read operation on the memory device 300 according to the control of the processing unit 110 and based on a second clock signal and a second power supply signal that are different from the first clock signal CLK and the first power supply signal PWR, respectively. Although not illustrated in FIG. 2, the second clock signal and the second power supply signal may be provided from the CMU 140 and the PMIC 200, respectively. For example, the processing unit 110 may operate as a master device, and the memory interface 160 may operate as a slave device.

The memory device 300 may be disposed outside the SOC 100, and may exchange data with the SOC 100 via the memory interface 160. In some example embodiments, the memory device 300 may include at least one volatile memory such as a dynamic random access memory (DRAM), a synchronous DRAM (SDRAM), a static random access memory (SRAM), etc., and/or at least one nonvolatile memory such as an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), or a polymer random access memory (PoRAM), etc. Alternatively, the memory device 300 may include a solid state drive or solid state disk (SSD), an embedded SSD (eSSD), a multimedia card (MMC), an embedded MMC (eMMC), a universal flash storage (UFS), etc.

The I/O interface 170 may control or facilitate data transfer between the SOC 100 and an external system (not illustrated). For example, the I/O interface 170 may control a data input operation or a data output operation of the SOC 100 according to the control of the processing unit 110 and based on a third clock signal and a third power supply signal that are different from the first clock signal CLK and the first power supply signal PWR, respectively. The third clock signal and the third power supply signal may also be different from the second clock signal and the second power supply signal, respectively. Although not illustrated in FIG. 2, the third clock signal and the third power supply signal may be provided from the CMU 140 and the PMIC 200, respectively. For example, the processing unit 110 may operate as a master device, and the I/O interface 170 may operate as a slave device.

In some example embodiments, the I/O interface 170 may support a serial advanced technology attachment (SATA), a SATA express (SATAe), a SAS (serial attached small computer system interface (SCSI)), a peripheral component interconnect-express (PCIe), a nonvolatile memory express (NVMe), or a mobile industry processor interface)(MIPI®).

The processing unit 110 and the memory interface 160 or the processing unit 110 and the I/O interface 170 may communicate signals and/or data with each other via the internal bus 101. In some example embodiments, the internal bus 101 may be implemented as an advanced microcontroller bus architecture (AMBA®), an advanced high-performance bus (AHB), an advanced peripheral bus (APB), an advanced extensible interface (AXI), an advanced system bus (ASB), AXI Coherency Extensions (ACE), or a combination thereof.

The PMIC 200 may be disposed outside the SOC 100, and may generate the first power supply signal PWR for the processing unit 110 based on the power management control signal CTRPM. For example, the PMIC 200 may increase, maintain or decrease the voltage level of the first power supply signal PWR based on the power management control signal CTRPM. Further, the PMIC 200 may generate the warning signal WS based on the power management control signal CTRPM, and may provide the warning signal WS to the control logic 130.

In some example embodiments, the processing unit 110 and the control logic 130 may be implemented as hardware. For example, the processing unit 110 and the control logic 130 may be included in a computer-based electronic system.

In some example embodiments, at least a part of the DVFS controller 120, the CMU 140 and the PMU 150 may be implemented as hardware. For example, at least a part of the DVFS controller 120, the CMU 140 and the PMU 150 may be included in a computer-based electronic system. In other example embodiments, at least a part of the DVFS controller 120, the CMU 140 and the PMU 150 may be implemented as instructions or program routines (e.g., a software program). For example, the instructions or the program routines may be executed by the processing unit 110, and may be stored in an internal storage (not illustrated) included in the SOC 100 or the memory device 300 located outside the SOC 100.

In some example embodiments, the SOC 100, the memory device 300 and/or components of the SOC 100 and the memory device 300 may be packaged in various forms, such as a package on package (PoP), a ball grid arrays (BGA), a chip scale packages (CSP), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flat pack (TQFP), a small outline IC (SOIC), a shrink small outline package (SSOP), a thin small outline package (TSOP), a system in package (SIP), a multichip package (MCP), a wafer-level fabricated package (WFP), or a wafer-level processed stack package (WSP). For example, in an example of the PoP, the SOC 100 may be formed as a first package, the memory device 300 may be formed as a second package, and the second package may be stacked over the first package.

An operation of the SOC 100 is described in detail according to example embodiments. First of all, the DVFS controller 120 sets an operating frequency of the plurality of processor cores 112, 114, 116 and 118 to a first operating frequency based on permitted power consumption of the SOC 100 and an operating status of the plurality of processor cores 112, 114, 116 and 118. The permitted power consumption of the SOC 100 is predetermined, and the first operating frequency is within a maximum operating frequency of the plurality of processor cores 112, 114, 116 and 118. The processing unit 110 drives at least one of the plurality of processor cores 112, 114, 116 and 118 based on the first operating frequency, and performs at least one processing operation based on the first operating frequency. The PMU 150 monitors present power consumption of the SOC 100. When the present power consumption exceeds the permitted power consumption, the PMU 150 notifies information about the excess of the present power consumption to the PMIC 200 based on the power management control signal CTRPM, and then the PMIC 200 activates the warning signal WS. The control logic 130 generates the first control signal CS1 immediately after the warning signal WS is activated such that the first control operation for urgently reducing the present power consumption is performed based on the first control signal CS1.

Although FIG. 2 illustrates an example where the DVFS controller 120 sets the operating frequency of the plurality of processor cores 112, 114, 116 and 118, any controller (not illustrated) that is disposed inside the SOC 100 and communicates with the processing unit 110 may set the operating frequency of the plurality of processor cores 112, 114, 116 and 118, according to example embodiments.

FIGS. 3A, 3B, 4A and 4B are diagrams for describing an operating status of a plurality of processor cores that are included in the SOC according to example embodiments.

Figure 3A:
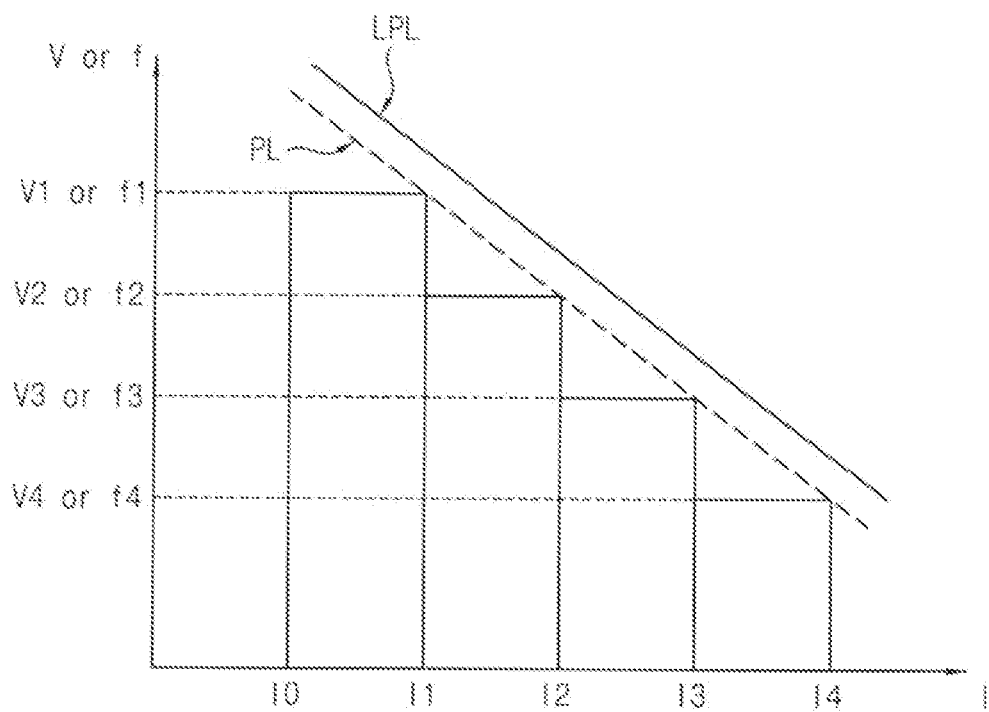
FIGS. 3A, 3B, 4A and 4B are diagrams for describing an operating status of a plurality of processor cores that are included in the SOC according to example embodiments.
Figure 3B:
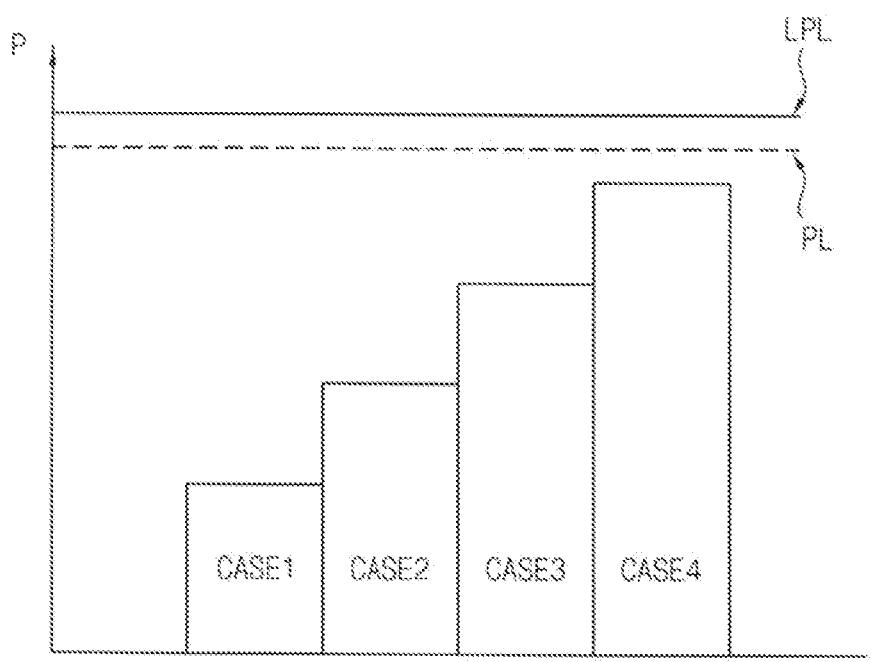

Referring to FIGS. 2, 3A and 3B, when the power consumption of the SOC 100 exceeds limited power consumption LPL, the SOC 100 may be damaged or may abnormally operate (e.g., a malfunction of the SOC 100 may be caused). For this reason, permitted power consumption PL that is lower than the limited power consumption LPL (e.g., that has a specific margin with respect to the limited power consumption LPL) may be predetermined, and the power consumption of the SOC 100 may be reduced when the power consumption of the SOC 100 exceeds the permitted power consumption PL. As a result, it may be prevented that the power consumption of the SOC 100 exceeds the limited power consumption LPL.

In a graph of FIG. 3A, a horizontal axis represents an amount of current I flowing through the SOC 100, and a vertical axis represents an operating voltage V or an operating frequency f of the SOC 100. Since power consumption is obtained by multiplying voltage and current (e.g., $P=V*I$), the limited power consumption LPL and the permitted power consumption PL, each of which has a constant value, are illustrated as diagonal lines in the graph of FIG. 3A. In addition, since the operating voltage V increases as the operating frequency f increases (e.g., since the operating voltage V and the operating frequency f are proportional to each other), the operating voltage V and the operating frequency f are illustrated in the same vertical axis.

In a graph of FIG. 3B, a vertical axis represents power consumption P of the SOC 100, and CASE1, CASE2, CASE3 and CASE4 represent examples where one processor core, two processor cores, three processor cores and four processor cores among the plurality of processor cores 112, 114, 116 and 118 are driven, respectively.

As illustrated in FIGS. 3A and 3B, the operating status of the plurality of processor cores 112, 114, 116 and 118 may include the number of processor cores that are used for performing at least one processing operation. The maximum operating frequency among different setting frequencies of the plurality of processor cores 112, 114, 116 and 118 may decrease as the number of processor cores that are used for performing the at least one processing operation increases.

For example, as illustrated in FIG. 3A, when one processor core (e.g., the processor core 112) is driven or operates, the amount of current I flowing through the SOC 100 may be I1, and the maximum operating voltage and the maximum operating frequency may be V1 and f1, which are relatively high voltage and frequency, respectively, within the permitted power consumption PL. When two processor cores (e.g., the processor cores 112 and 114) are driven or operate, the amount of current I flowing through the SOC 100 may be I2, which is greater than I1, and the maximum operating voltage and the maximum operating frequency may be V2 and f2, which are lower than V1 and f1, respectively, within the permitted power consumption PL. Similarly, when three processor cores (e.g., the processor cores 112, 114 and 116) are driven or operate, the amount of current I flowing through the SOC 100 may be I3, which is greater than I2, and the maximum operating voltage and the maximum operating frequency may be V3 and f3, which are lower than V2 and f2, respectively, within the permitted power consumption PL. When four processor cores (e.g., the processor cores 112, 114, 116 and 118) are driven or operate, the amount of current I flowing through the SOC 100 may be I4, which is greater than I3, and the maximum operating voltage and the maximum operating frequency may be V4 and f4, which are lower than V3 and f3, respectively, within the permitted power consumption PL. In FIG. 3A, I0 represents a default amount of current I while the SOC 100 is powered on.

In addition, as illustrated in FIG. 3B, when the processor cores are driven or operate based on the same operating frequency, the power consumption may be changed according to the number of processor cores that are used for performing the at least one processing operation. For example, power consumption of CASE2 in which two processor cores are driven may be greater than power consumption of CASE1 in which one processor core is driven. Similarly, power consumption of CASE3 in which three processor cores are driven may be greater than the power consumption of CASE2, and power consumption of CASE4 in which four processor cores are driven may be greater than the power consumption of CASE3. Thus, the operating frequency of the processor cores may be set higher as the number of processor cores that are used for performing the at least one processing operation decreases.

Although relationships between the number of processor cores, the maximum operating frequency and the power consumption are described based on FIGS. 3A and 3B and an example where the SOC 100 includes four processor cores 112, 114, 116 and 118, the number of processor cores included in the SOC may not be limited thereto, and may be changed according to example embodiments.

Figure 4A:
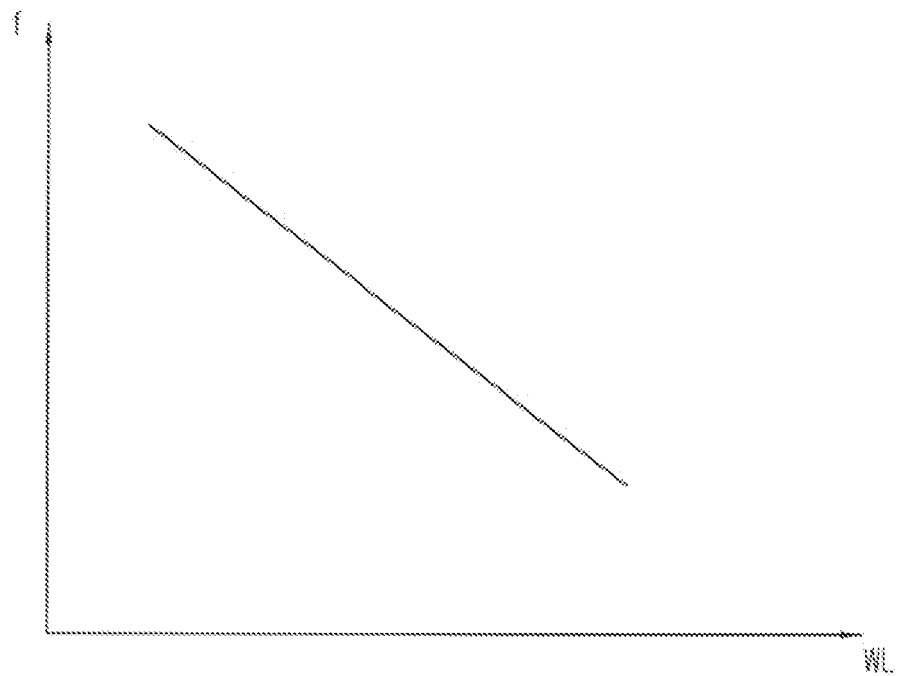

In a graph of FIG. 4A, a horizontal axis represents a workload WL of a processing operation that is performed by the SOC 100, and a vertical axis represents the operating frequency f of the SOC 100. In a graph of FIG. 4B, a vertical axis represents the power consumption P of the SOC 100, CASEA represent an example where a processing operation with a relatively low amount of workload is performed, and CASEB represent an example where a processing operation with a relatively high amount of workload is performed.

Figure 4B:
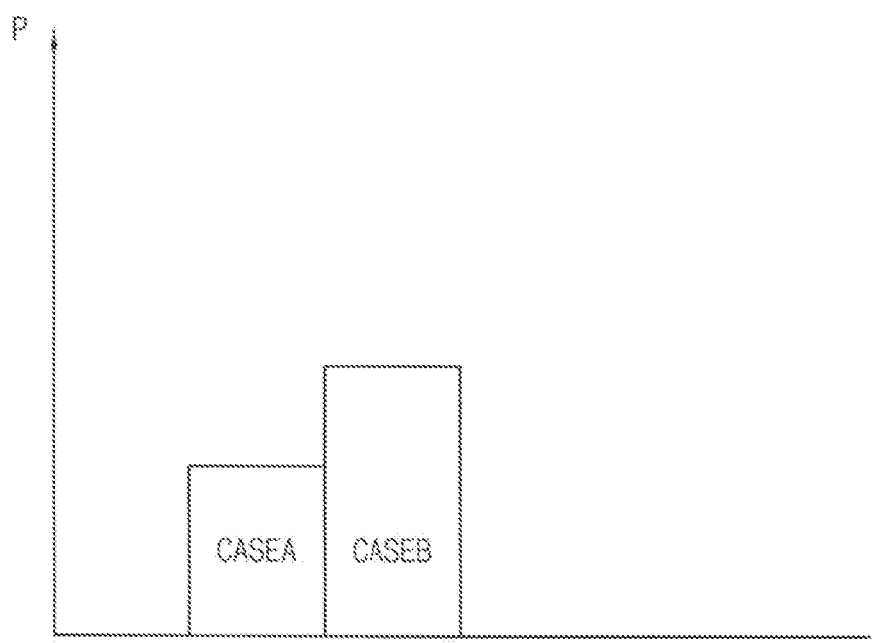

Referring to FIGS. 2, 4A and 4B, the operating status of the plurality of processor cores 112, 114, 116 and 118 may include a workload of at least one processing operation that is performed by at least one of the plurality of processor cores 112, 114, 116 and 118. For example, as illustrated in FIG. 4A, the maximum operating frequency f among different setting frequencies of the plurality of processor cores 112, 114, 116 and 118 may decrease as the workload WL of the at least one processing operation increases.

In addition, as illustrated in FIG. 4B, when the same number of (e.g., two) processor cores is driven or operates, the power consumption may be changed according to types of processing operations. For example, power consumption of CASEB in which the processing operation (e.g., a floating calculation) with the relatively high amount of workload is performed may be greater than power consumption of CASEA in which the processing operation (e.g., an integer calculation) with the relatively low amount of workload is performed. Thus, the operating frequency of the processor cores may be set higher as the amount of workload of the processing operation decreases.

In some example embodiments, the operating status of the plurality of processor cores 112, 114, 116 and 118 may include both the number of processor cores that are used for performing the at least one processing operation and the workload of the at least one processing operation. In other words, the maximum operating frequency may be determined in accordance with all of the number of processor cores and the workload. In some example embodiments, the maximum operating frequency may be determined in accordance with at least one of various parameters other than the number of processor cores and the workload, or a combination thereof.

Figure 5:
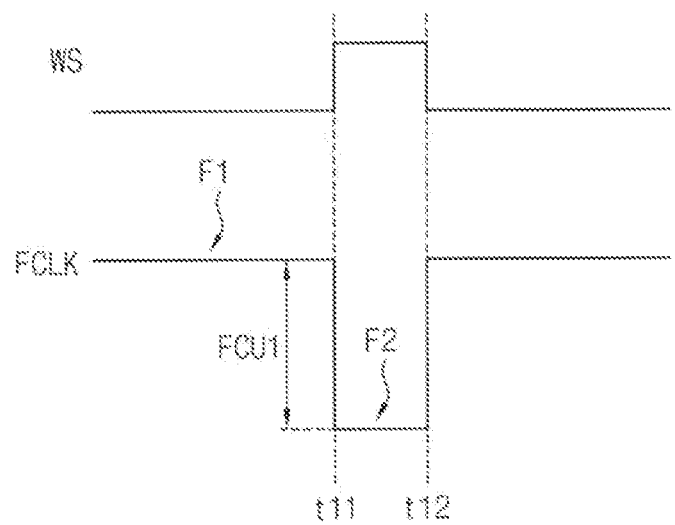
FIG. 5 is a timing diagram for describing the method of FIG. 1.

FIG. 5 is a timing diagram for describing the method of FIG. 1.

Referring to FIGS. 1, 2 and 5, at time t11, the present power consumption of the SOC 100 exceeds the permitted power consumption, and the PMIC 200 activates the warning signal WS. For example, the warning signal WS may be transitioned from a first logic level (e.g., a logic low level) to a second logic level (e.g., a logic high level).

The control logic 130 performs the first control operation for reducing the present power consumption immediately after the warning signal WS is activated. For example, the control logic 130 may generate the first control signal CS1 in response to an edge of the warning signal WS such that the first control operation is performed based on the first control signal CS1.

The CMU 140 performs the first control operation based on the first control signal CS1. For example, the CMU 140 may urgently and drastically decrease a frequency FCLK of the first clock signal CLK that corresponds to the operating frequency of the plurality of processor cores 112, 114, 116 and 118 in response to the first control signal CS1. For example, the frequency FCLK of the first clock signal CLK may be decreased once from a first operating frequency F1 to an operating frequency F2 that is lower than the first operating frequency F1 by a first frequency FCU1. In other words, the frequency FCLK of the first clock signal CLK may be decreased once by the first frequency FCU1. The first frequency FCU1 in FIG. 5 may be much greater than a second frequency FCU2 in FIG. 8. For example, after the first control operation is performed, the frequency FCLK of the first clock signal CLK may be decreased by about a half of the first operating frequency F1.

At time t12, when a predetermined time is elapsed after the first control operation is performed (e.g., when the present power consumption becomes less than the permitted power consumption), the warning signal WS is deactivated. When the warning signal WS is deactivated, the frequency FCLK of the first clock signal CLK may be recovered or returned to the first operating frequency F1.

Although the first control operation is described based on FIG. 5 and an example where the frequency FCLK of the first clock signal CLK is decreased once by the first frequency FCU1, the inventive concept may not be limited thereto. For example, the number of times of decreasing the frequency FCLK in the first control operation may be set differently in a phase of designing and/or manufacturing of the SOC, and the frequency FCLK of the first clock signal CLK may be decreased, e.g., twice, three times, . . . , etc. However, the number of times of decreasing the frequency FCLK may not be changed, and may be fixed once it is set or established.

Although the first control operation is described based on an example where the frequency FCLK of the first clock signal CLK is decreased, the inventive concept may not be limited thereto. For example, the first control operation may be any operation for urgently and drastically reducing the present power consumption, such as an operation of decreasing the voltage level of the first power supply signal PWR, an operation of stopping at least one of the plurality of processor cores 112, 114, 116 and 118, an operation of stopping or skipping at least one processing operation, etc.

Figure 6:
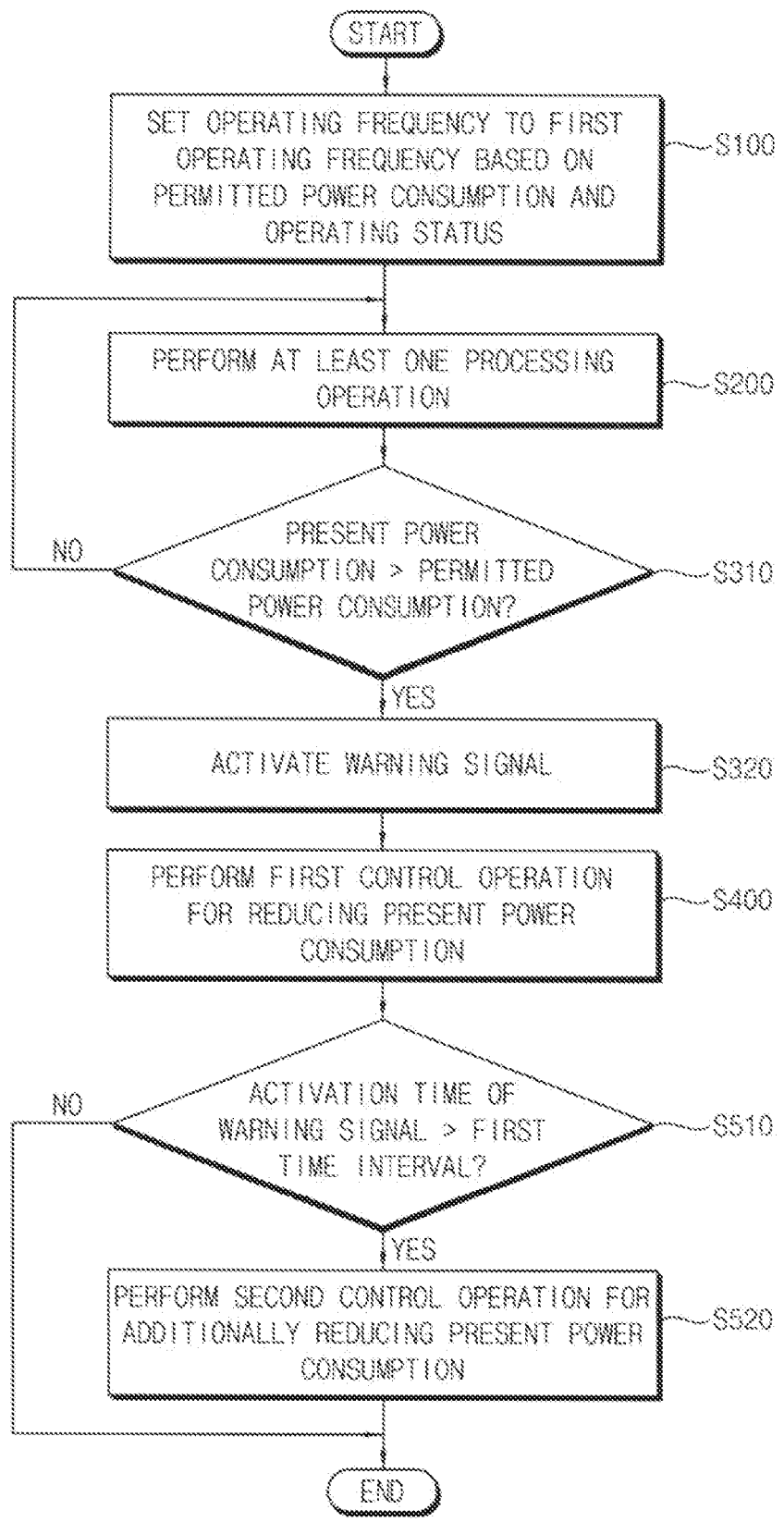
FIG. 6 is a flow chart illustrating a method of operating a SOC according to example embodiments.

FIG. 6 is a flow chart illustrating a method of operating a SOC according to example embodiments.

Referring to FIG. 6, an example of FIG. 6 may be substantially the same as an example of FIG. 1, except that operations S510 and S520 are further included in FIG. 6. Operations S100, S200, S310, S320 and S400 in FIG. 6 may be substantially the same as steps S100, S200, S310, S320 and S400 in FIG. 1, respectively, and thus repeated descriptions are omitted.

In a method of operating a SOC according to example embodiments, the present power consumption of the SOC may still exceed the permitted power consumption after the first control operation for reducing the present power consumption is performed. In this case, an additional action for reducing the present power consumption may be further performed.

For example, after the first control operation is performed (S400), it may be determined whether an activation of the warning signal is continued for equal to or more than a first time interval (S510).

When an activation time of the warning signal is longer than the first time interval (S510: YES), e.g., when the present power consumption of the SOC still exceeds the permitted power consumption even though the first control operation is performed, a second control operation for additionally reducing the present power consumption may be performed (S520). For example, unlike the first control operation, the second control operation may represent an operation of reducing the present power consumption relatively slowly, gradually, steadily and step by step. The second control operation will be described in detail with reference to FIG. 8.

When the activation time of the warning signal is shorter than or equal to the first time interval (S510: NO), it may represent that the present power consumption of the SOC is already less than the permitted power consumption, and the warning signal may already be deactivated. Thus, the method of operating the SOC according to example embodiments may be terminated without any additional action. Alternatively, the remaining processing operation may be performed by the SOC, or a following processing operation by the SOC may be in queue, according to example embodiments.

Figure 7:
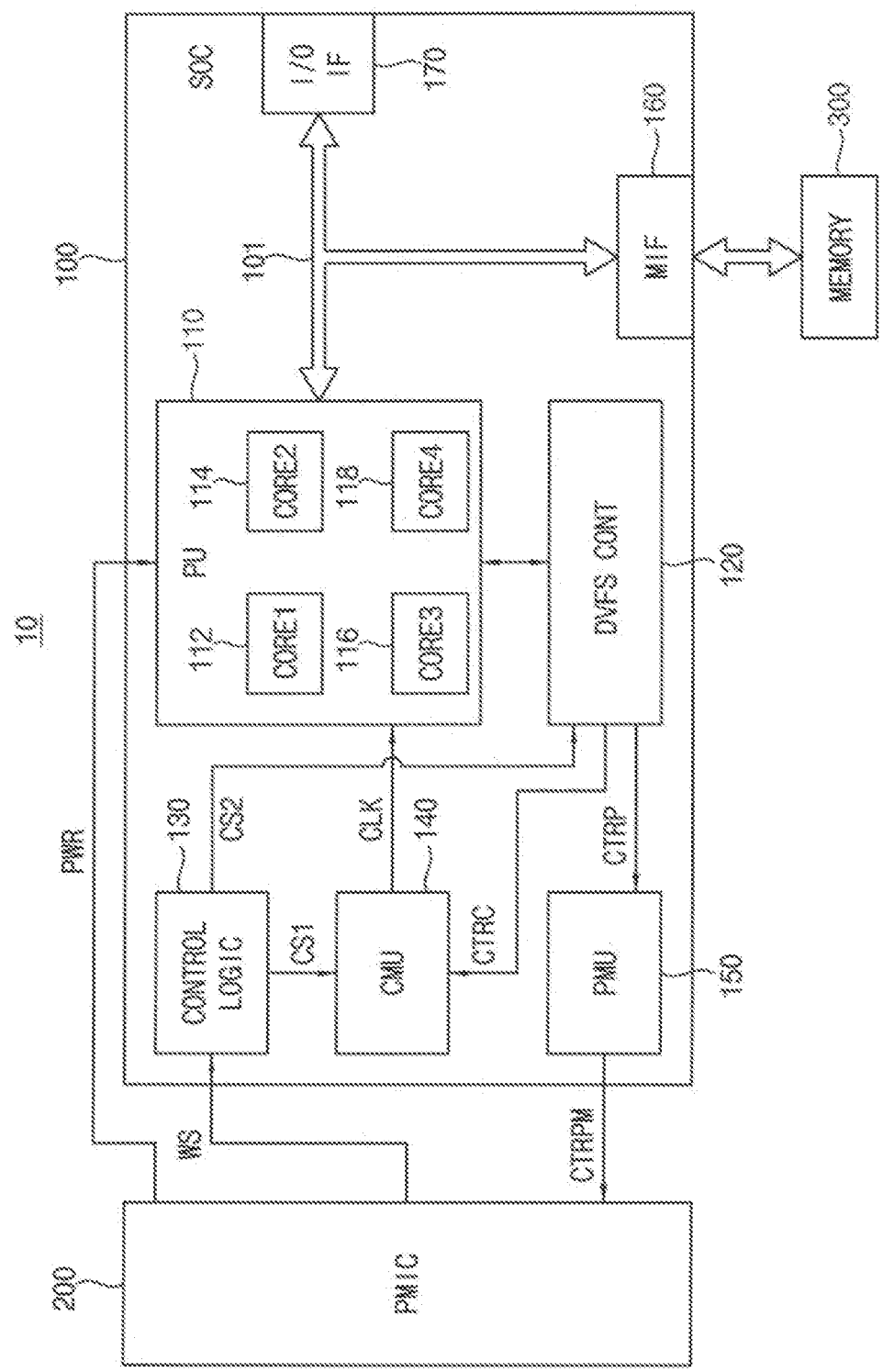
FIG. 7 is a block diagram illustrating an electronic system including a SOC according to example embodiments.

FIG. 7 is a block diagram illustrating an electronic system including a SOC according to example embodiments.

Referring to FIG. 7, an electronic system 10 of FIG. 7 may be substantially the same as the electronic system 10 of FIG. 2, except that a control logic 130 in FIG. 7 further generates a second control signal CS2. The SOC 100, the internal bus 101, the processing unit 110, the plurality of processor cores 112, 114, 116 and 118, the DVFS controller 120, the control logic 130, the CMU 140, the PMU 150, the memory interface 160, the I/O interface 170, the PMIC 200 and the memory device 300 in FIG. 7 may be substantially the same as the SOC 100, the internal bus 101, the processing unit 110, the plurality of processor cores 112, 114, 116 and 118, the DVFS controller 120, the control logic 130, the CMU 140, the PMU 150, the memory interface 160, the I/O interface 170, the PMIC 200 and the memory device 300 in FIG. 2, respectively. Thus, repeated descriptions are omitted.

The control logic 130 in FIG. 7 may generate the first control signal CS1 immediately after the warning signal WS is activated such that the first control operation for urgently reducing the present power consumption is performed based on the first control signal CS1. In addition, when an activation of the warning signal WS is continued for equal to or more than a predetermined time interval, e.g., when an activation time of the warning signal WS is longer than the first time interval, the control logic 130 in FIG. 7 may generate the second control signal CS2 such that the second control operation for additionally reducing the present power consumption is performed based on the second control signal CS2.

Figure 8:
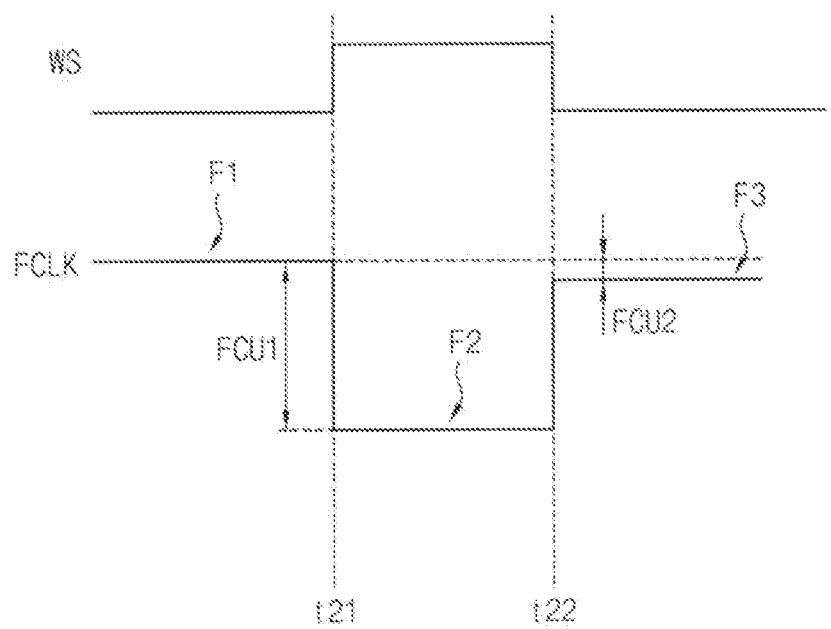
FIG. 8 is a timing diagram for describing the method of FIG. 6.

FIG. 8 is a timing diagram for describing the method of FIG. 6.

Referring to FIGS. 6, 7 and 8, an operation at time t21 may be substantially the same as an operation at time t11 in FIG. 5, and thus repeated descriptions are omitted.

The present power consumption of the SOC 100 still exceeds the permitted power consumption after time t21, and thus the PMIC 200 still maintains the activation of the warning signal WS.

At time t22, the warning signal WS is deactivated. When the activation time of the warning signal WS is longer than the first time interval, e.g., when a time interval from time t21 to time t22 is longer than the first time interval, the control logic 130 performs the second control operation for additionally reducing the present power consumption. For example, the control logic 130 may generate the second control signal CS2 such that the second control operation is performed based on the second control signal CS2. For example, the control logic 130 may include a timer or a counter that is used for determining whether the activation time of the warning signal WS is longer than the first time interval.

The DVFS controller 120 and the CMU 140 perform the second control operation based on the second control signal CS2. For example, the DVFS controller 120 may control the first clock control signal CTRC in response to the second control signal CS2, and the CMU 140 may decrease the frequency FCLK of the first clock signal CLK that corresponds to the operating frequency of the plurality of processor cores 112, 114, 116 and 118 in response to the second control signal CS2. After decreasing the frequency FCLK of the first clock signal CLK, and thus, the present power consumption becomes less than the permitted power consumption, the warning signal WS may be deactivated at t22. When the warning signal WS is deactivated at time t22, the frequency FCLK of the first clock signal CLK may be increased from the operating frequency F2 to an operating frequency F3 that is higher than the operating frequency F2. The operating frequency F3 after time t22 may be lower than the first operating frequency F1 by a second frequency FCU2. In other words, when the warning signal WS is deactivated and when the frequency FCLK of the first clock signal CLK is to be recovered, the frequency FCLK of the first clock signal CLK may be recovered to the operating frequency F3 that is lower than the first operating frequency F1 by the second frequency FCU2. The second frequency FCU2 may be much smaller than the first frequency FCU1 in FIG. 5.

Although the second control operation is described based on FIG. 8 and an example where the frequency FCLK of the first clock signal CLK is decreased once by the second frequency FCU2, the inventive concept may not be limited thereto. For example, as will be described with reference to FIGS. 11 and 12, the number of times of decreasing the frequency FCLK in the second control operation may be changed according to the second frequency FCU2, a difference between the present power consumption and the permitted power consumption, etc.

Although the second control operation is described based on an example where the frequency FCLK of the first clock signal CLK is decreased, the inventive concept may not be limited thereto. For example, the second control operation may be any operation for additionally reducing the present power consumption, such as an operation of decreasing the voltage level of the first power supply signal PWR, etc.

Figure 9:
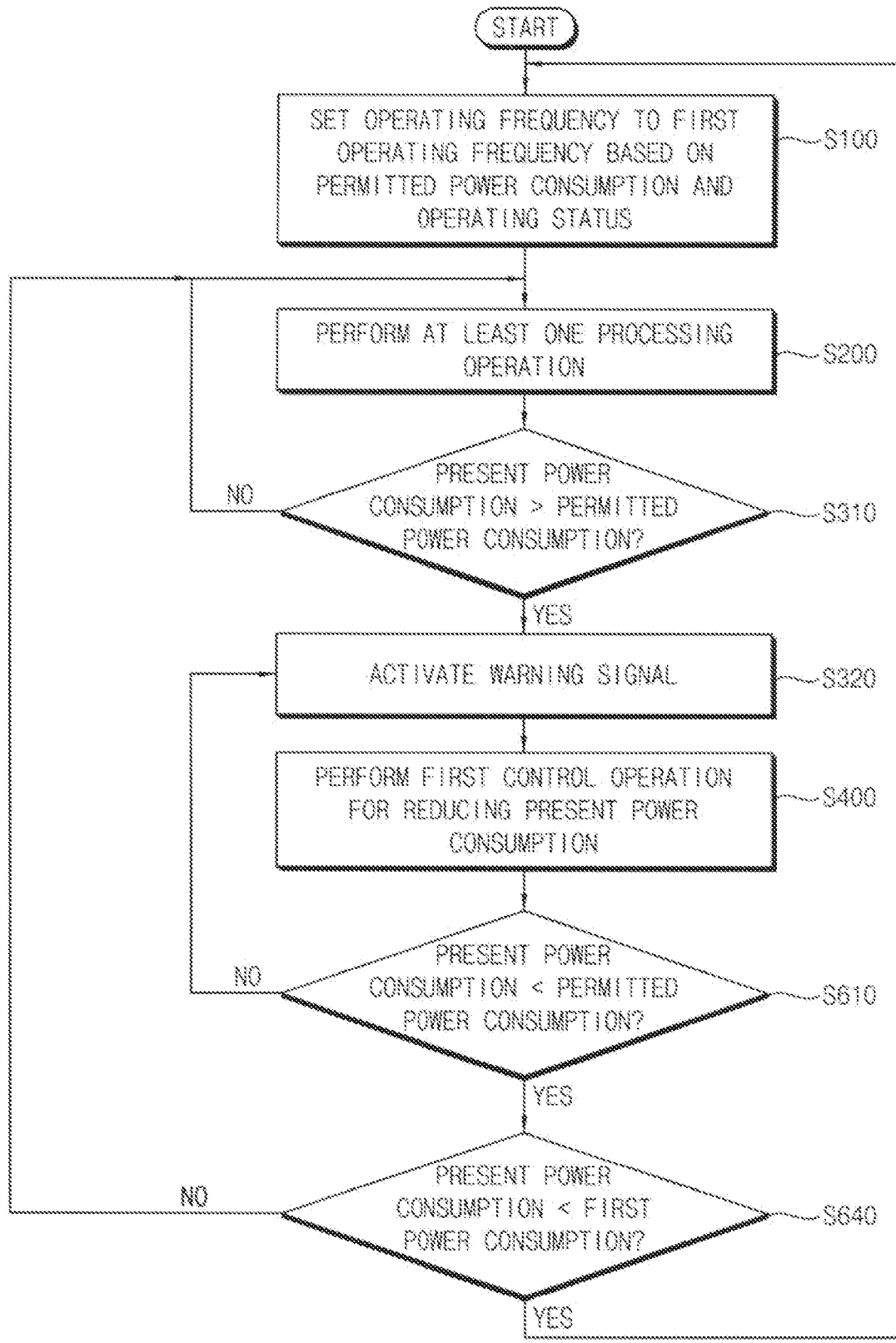
FIGS. 9 and 10 are flow charts illustrating a method of operating a SOC according to example embodiments.
Figure 10:
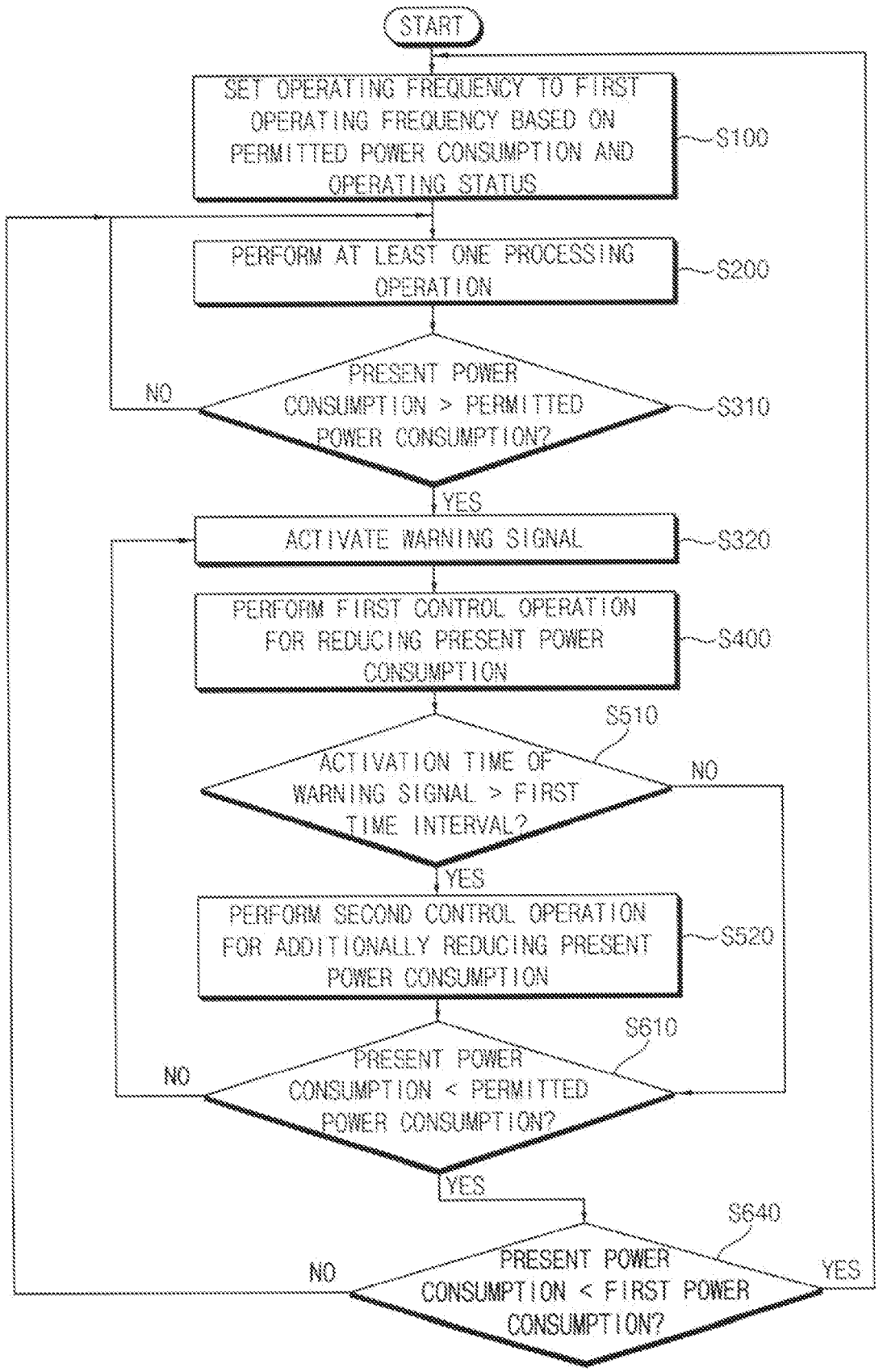

FIGS. 9 and 10 are flow charts illustrating a method of operating a SOC according to example embodiments.

Referring to FIGS. 9 and 10, examples of FIGS. 9 and 10 may be substantially the same as examples of FIGS. 1 and 6, respectively, except that operations S610 and S640 are further included in FIGS. 9 and 10. Thus, repeated descriptions are omitted.

In a method of operating a SOC according to example embodiments, after the first control operation for reducing the present power consumption is performed (S400), or after the second control operation for additionally reducing the present power consumption is performed (S520), it may be determined again whether the present power consumption exceeds the permitted power consumption (S610).

When the present power consumption exceeds the permitted power consumption (S610: NO), the warning signal may be activated again (S320), and then operation S400 may be repeated in the example of FIG. 9, or operations S400, S510 and S520 may be repeated in the example of FIG. 10.

When the present power consumption becomes less than the permitted power consumption (S610: YES), the warning signal may be deactivated as described with reference to FIGS. 5 and 8, and then it may be determined whether the present power consumption is lower than first power consumption (S640).

When the present power consumption is greater than or equal to the first power consumption (S640: NO), it may represent that the SOC should perform the at least one processing operation based on the operating frequency that is decreased by the first control operation in operation S400 and/or the second control operation in operation S520. In this case, operation S200 may be performed with maintaining the decreased operating frequency. In other words, the remaining processing operation may be performed by the SOC based on the decreased operating frequency, or the following processing operation by the SOC may be in queue based on the decreased operating frequency.

When the present power consumption becomes lower than the first power consumption (S640: YES), it may represent that the performance of the SOC is to be degraded if the SOC performs the at least one processing operation based on the decreased operating frequency. In this case, operation S100 may be performed for increasing the operating frequency.

For example, the operating frequency of the plurality of processor cores may be set to the first operating frequency within the maximum operating frequency based on the permitted power consumption and the operating status of the plurality of processor cores. Alternatively, the operating frequency of the plurality of processor cores may be set to a second operating frequency that is different from the first operating frequency.

Figure 11:
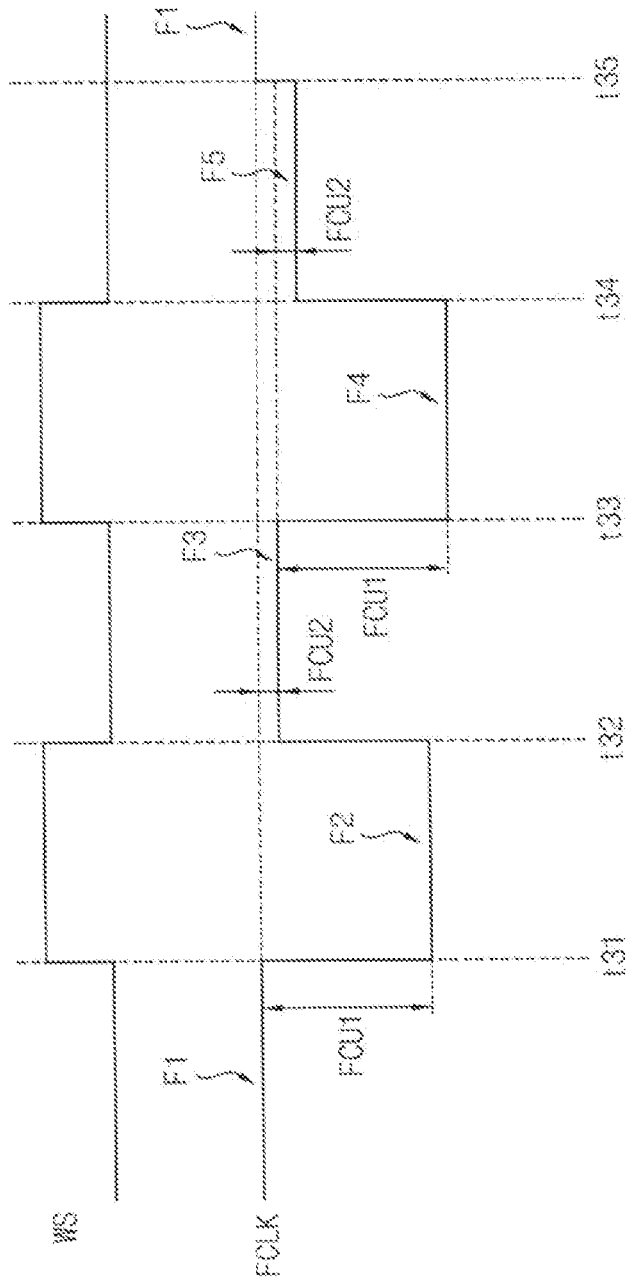
FIGS. 11 and 12 are timing diagrams for describing the methods of FIGS. 9 and 10.
Figure 12:
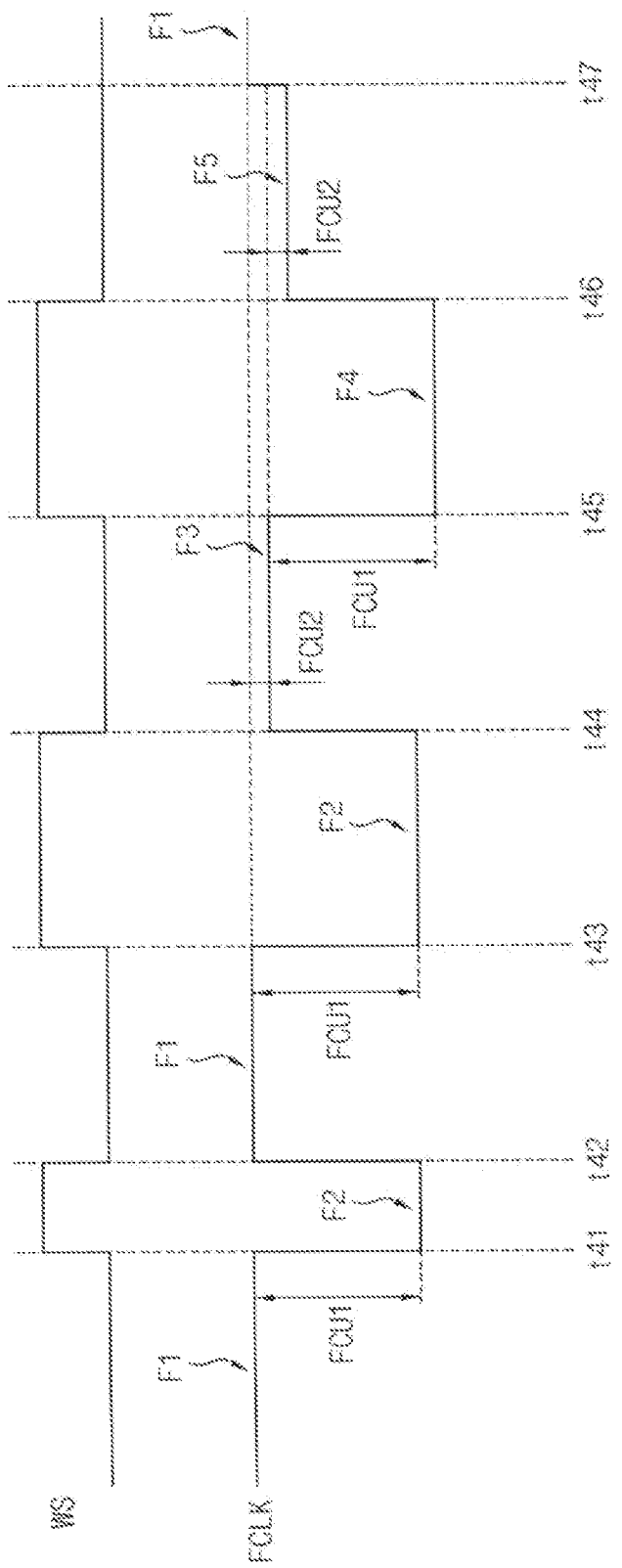

FIGS. 11 and 12 are timing diagrams for describing the methods of FIGS. 9 and 10.

Referring to FIGS. 9, 10 and 11, operations at time t31 and time t32 may be substantially the same as operations at time t21 and time t22 in FIG. 8, respectively, and thus repeated descriptions are omitted.

After the warning signal WS is deactivated at time t32, the present power consumption exceeds the permitted power consumption again. At time t33, the warning signal WS is activated again, and thus the first control operation is performed again. For example, the frequency FCLK of the first clock signal CLK may be decreased once from the operating frequency F3 to an operating frequency F4 that is lower than the operating frequency F3 by the first frequency FCU1.

At time t34, when a predetermined time is elapsed after the first control operation is performed, the warning signal WS is deactivated. When the activation time of the warning signal WS is longer than the first time interval, e.g., when a time interval from time t33 to time t34 is longer than the first time interval, the second control operation is performed again. For example, the frequency FCLK of the first clock signal CLK may be increased from the operating frequency F4 to an operating frequency F5 that is higher than the operating frequency F4. The operating frequency F5 after time t34 may be lower than the operating frequency F3 by the second frequency FCU2. In other words, when the second control operation is continuously performed (e.g., repeated), the frequency FCLK of the first clock signal CLK may be decreased by the second frequency FCU2 step by step.

At time t35, after the warning signal WS is deactivated at time t34, the present power consumption becomes lower than the first power consumption. The frequency FCLK of the first clock signal CLK that corresponds to the operating frequency of the plurality of processor cores 112, 114, 116 and 118 may be set to the first operating frequency again based on the permitted power consumption and the operating status of the plurality of processor cores 112, 114, 116 and 118.

In some example embodiments, as illustrated in FIG. 11, when the operating status of the plurality of processor cores 112, 114, 116 and 118 before time t31 is substantially the same as the operating status of the plurality of processor cores 112, 114, 116 and 118 after time t35, the frequency FCLK of the first clock signal CLK before time t31 and the frequency FCLK of the first clock signal CLK after time t35 may be substantially the same as each other (e.g., the first operating frequency F1). In other example embodiments, although not illustrated in FIG. 11, when the operating status of the plurality of processor cores 112, 114, 116 and 118 before time t31 is different from the operating status of the plurality of processor cores 112, 114, 116 and 118 after time t35, the frequency FCLK of the first clock signal CLK before time t31 and the frequency FCLK of the first clock signal CLK after time t35 may be different from each other.

Referring to FIGS. 9, 10 and 12, operations at time t41 and time t42 may be substantially the same as operations at time t11 and time t12 in FIG. 5, respectively, operations at time t43 and time t44 may be substantially the same as operations at time t21 and time t22 in FIG. 8, respectively, and operations at time t45, time t46 and time t47 may be substantially the same as operations at time t33, time t34 and time t35 in FIG. 11, respectively. Thus, repeated descriptions are omitted.

Although not illustrated in FIGS. 11 and 12, when the activation time of the warning signal WS is shorter than or equal to the first time interval after time t33 in FIG. 11 or after time t43 or time t45 in FIG. 12, the second control operation may be omitted.

In a related art SOC, a maximum operating frequency of a multi-core processing unit may be determined by searching for the maximum operating frequency satisfying limitation in which the SOC performs a processing operation with maximum power consumption. However, the related art SOC has a problem with a single maximum operating frequency regardless of the number of processor cores that actually work or operate and/or the types of processing operations.

For example, when the processor cores are driven or operate based on the same operating frequency, power consumption of a case in which two processor cores are driven is different from power consumption of a case in which four processor cores are driven. Thus, the operating frequency or the maximum operating frequency may be set higher as the number of processor cores that actually work or operate decreases, however, the related art SOC cannot be implemented in this manner because the related art SOC has a single maximum operating frequency. For another example, when the same number of processor cores is driven or operates, power consumption of a case in which an integer calculation is performed is different from power consumption of a case in which a floating calculation is performed. Thus, the operating frequency or the maximum operating frequency may be set higher as the amount of workload of the processing operation decreases, however, the related art SOC cannot be implemented in this manner because the related art SOC has a single maximum operating frequency. In other words, in the related art SOC, a single maximum operating frequency may be determined based on the processing operation with the maximum power consumption, and thus performance of the related art SOC cannot be maximized or optimized when the number of processor cores that actually work or operate decreases or when a processing operation with a relatively low workload is performed.

In the method of operating the SOC 100 and the SOC that performs the method according to example embodiments, the operating frequency of the plurality of processor cores 112, 114, 116 and 118 may be determined among different setting frequencies, without restriction, within a range of satisfying the permitted power consumption PL. In addition, when the present power consumption of the SOC 100 almost reaches the permitted power consumption PL, the operating frequency may be decreased based on the warning signal WS that is provided from the PMIC 200, and thus the power consumption of the SOC 100 may not exceed the limited power consumption LPL. Accordingly, the SOC 100 may operate based on the highest operating frequency within the permitted power consumption PL, and performance of the SOC 100 and the electronic system 10 including the SOC 100 may be maximized and optimized.

Although the above example embodiments are described based on examples where the operating frequency of the plurality of processor cores 112, 114, 116 and 118 included in the processing unit 110 is controlled or adjusted, the inventive concept may not be limited thereto. For example, when the processing unit 110 is implemented as a CPU, the inventive concept may be employed in a non-CPU intellectual property (IP) other than the CPU.

The non-CPU IP may represent an IP not having a CPU, and the IP may be a hardware module having custom design features and/or functions. For example, the non-CPU IP may operate as a slave device of the CPU, and may include the memory interface 160 and the I/O interface 170 in FIG. 2. As described above, although not illustrated in FIG. 2, the memory interface 160 may operate based on the second clock signal and the second power supply signal, and the I/O interface 170 may operate based on the third clock signal and the third power supply signal. A frequency of the second clock signal and/or a frequency of the third clock signal may be set within a maximum operating frequency based on the permitted power consumption of the SOC 100 and an operating status of the memory interface 160 and/or the I/O interface 170, according to example embodiments.

Alternatively, the inventive concept may be employed in both the processing unit 110 (e.g., a CPU) and the non-CPU IP.

Figure 13:
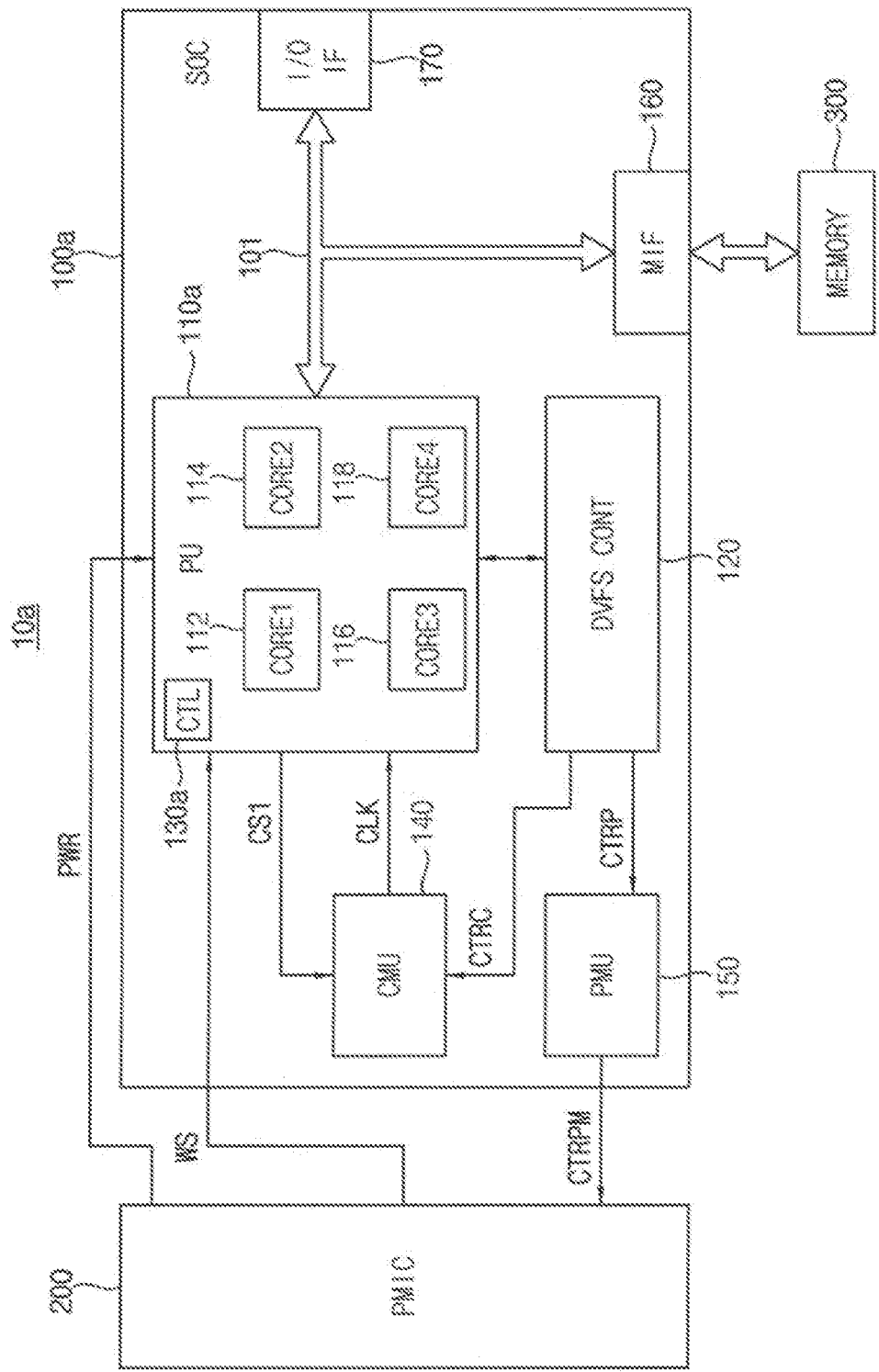
FIGS. 13 and 14 are block diagrams illustrating an electronic system including a SOC according to example embodiments.
Figure 14:
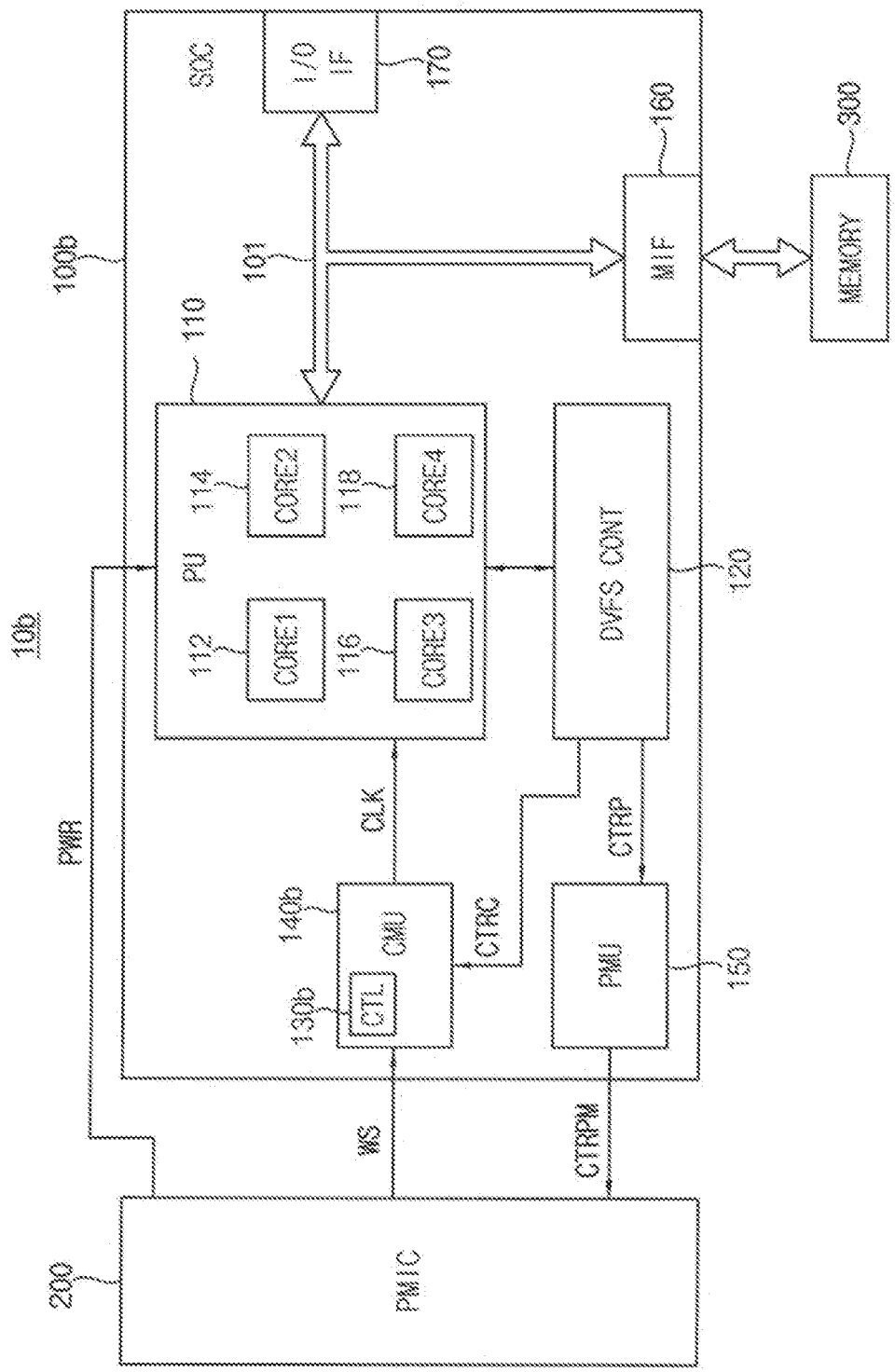

FIGS. 13 and 14 are block diagrams illustrating an electronic system including a SOC according to example embodiments.

Referring to FIG. 13, an electronic system 10a and a SOC 100a of FIG. 13 may be substantially the same as the electronic system 10 and the SOC 100 of FIG. 2, respectively, except that a control logic 130a in FIG. 13 is disposed or located inside a processing unit 110a in FIG. 13. Thus, repeated descriptions are omitted.

Referring to FIG. 14, an electronic system 10b and a SOC 100b of FIG. 14 may be substantially the same as the electronic system 10 and the SOC 100 of FIG. 2, respectively, except that a control logic 130b in FIG. 14 is disposed or located inside a CMU 140b in FIG. 14. Thus, repeated descriptions are omitted.

In some example embodiments, as illustrated in FIG. 7, the control logic 130a in FIG. 13 or the control logic 130b in FIG. 14 may further generate the second control signal CS2.

As will be appreciated by those skilled in the art, the inventive concept may be embodied as a system, method, computer program product, and/or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device. For example, the computer readable medium may be a non-transitory computer readable medium.

The inventive concept may apply to various kinds of SOCs or a system including the SOCs, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, a wearable device, an IoT device, an IoE device, an e-book, a VR device, an AR device, a robotic device, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive concept. Accordingly, all such modifications are intended to be included within the scope of the inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A system comprising:
 a processing unit comprising a plurality of processor cores, and configured to perform at least one processing operation at an operating frequency;
 a power management integrated circuit (PMIC) configured to supply power to the processing unit based on a power management control signal and provide a warning signal,
 wherein the processing unit is further configured to control the operating frequency and the power based on permitted power consumption and an operating status of the plurality of processor cores,
wherein the processing unit is further configured to generate a control signal for changing the operating frequency based on the warning signal,
wherein, when the warning signal is activated, the operating frequency is decreased by a first predetermined amount,
wherein, when the activated warning signal is deactivated and an activation time of the warning signal is shorter than a first time interval, the operating frequency is increased by the first predetermined amount, and
wherein, when the activated warning signal is deactivated and the activation time of the warning signal is longer than the first time interval, the operating frequency is increased by a second predetermined amount less than the first predetermined amount.

2. The system of claim 1, wherein the warning signal is activated when power consumption of the processing unit exceeds the permitted power consumption.

3. The system of claim 1, wherein, when the warning signal is reactivated, the operating frequency is decreased by the first predetermined amount.

4. The system of claim 3, wherein, when the reactivated warning signal is deactivated and a reactivation time of the warning signal is longer than the first time interval, the operating frequency is increased by the second predetermined amount.

5. The system of claim 4,
wherein, before the warning signal is activated, the operating frequency is set to a first operating frequency, and
wherein, after the reactivated warning signal is deactivated and power consumption of the processing unit is lower than first power consumption, the operating frequency is set to the first operating frequency again.

6. The system of claim 5, wherein the first power consumption is less than the permitted power consumption.

7. The system of claim 1,
wherein the processing unit is further configured to monitor power consumption of the processing unit, generate the power management control signal, and transmit the power management control signal to the PMIC.

8. The system of claim 1,
wherein the processing unit is further configured to generate a first clock signal corresponding to the operating frequency.

9. A system comprising:
a processing unit comprising a plurality of processor cores, and configured to perform at least one processing operation at an operating frequency;
wherein the processing unit is further configured to:
control the operating frequency based on permitted power consumption and an operating status of the plurality of processor cores, and
generate a first control signal for changing the operating frequency based on a warning signal from a power management integrated circuit (PMIC), and
generate a first clock signal based on the first control signal, the first clock signal corresponding to the operating frequency,
wherein, when the warning signal is activated, the operating frequency is decreased by a first predetermined amount,
wherein, when the activated warning signal is deactivated and an activation time of the warning signal is shorter than a first time interval, the operating frequency is increased by the first predetermined amount, and
wherein, when the activated warning signal is deactivated and the activation time of the warning signal is longer than the first time interval, the operating frequency is increased by a second predetermined amount less than the first predetermined amount.

10. The system of claim 9, wherein, when the warning signal is activated, the processing unit is further configured to decrease a frequency of the first clock signal by the first predetermined amount based on the first control signal.

11. The system of claim 9, wherein the processing unit is further configured to generate a second control signal for changing the operating frequency based on the warning signal.

12. The system of claim 11, wherein, when the activated warning signal is deactivated and the activation time of the warning signal is longer than the first time interval, the processing unit is configured to increase a frequency of the first clock signal by the second predetermined amount based on the second control signal.

13. The system of claim 9, wherein the warning signal is activated when power consumption of the processing unit exceeds the permitted power consumption.

14. The system of claim 9, wherein, when the warning signal is reactivated, the operating frequency is decreased by the first predetermined amount.

15. The system of claim 14, wherein, when the reactivated warning signal is deactivated and a reactivation time of the warning signal is longer than the first time interval, the operating frequency is increased by the second predetermined amount.

16. The system of claim 15,
wherein, before the warning signal is activated, the operating frequency is set to a first operating frequency, and
wherein, after the reactivated warning signal is deactivated and power consumption of the processing unit is lower than first power consumption, the operating frequency is set to the first operating frequency again.

17. The system of claim 16, wherein the first power consumption is less than the permitted power consumption.

18. The system of claim 9, further comprising:
the PMIC configured to supply power to the processing unit based on a power management control signal and provide the warning signal,
wherein the processing unit is further configured to monitor power consumption of the processing unit, generate the power management control signal, and transmit the power management control signal to the PMIC.

* * * * *